(12) United States Patent
Ohkoshi et al.

(10) Patent No.: US 7,946,082 B2
(45) Date of Patent: May 24, 2011

(54) STRUCTURE SUPPORT APPARATUS AND STRUCTURE INSTALLATION METHOD (75) Inventors: Yasushi Ohkoshi, Osaka (JP); Miho Terunuma, Osaka (JP); Yoshihiro Aramaki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 53 days.

(21) Appl. No.: 11/896,121

(22) Filed: Aug. 29, 2007

(65) Prior Publication Data
US 2008/0053008 A1 Mar. 6, 2008

(30) Foreign Application Priority Data

Sep. 1, 2006 (JP) ................................ 2006-238089

(51) Int. Cl.
*E04D 13/18* (2006.01)
(52) U.S. Cl. ........................ 52/173.3; 52/173.1; 248/237
(58) Field of Classification Search .................. 52/173.1, 52/409, 410; 248/148, 237, 342, 343, 344
See application file for complete search history.

(56) References Cited

U.S. PATENT DOCUMENTS

| | | | | | |
|---|---|---|---|---|---|
| 4,852,323 | A | * | 8/1989 | Kartfilt ............................ | 52/410 |
| 5,867,958 | A | * | 2/1999 | Ditka et al. ...................... | 52/410 |
| 5,887,831 | A | * | 3/1999 | Post .................................. | 248/49 |
| 6,205,730 | B1 | * | 3/2001 | Hasan et al. ..................... | 52/408 |
| 6,250,034 | B1 | * | 6/2001 | Hulsey ............................. | 52/410 |
| 6,282,857 | B1 | * | 9/2001 | Rubenacker ..................... | 52/410 |
| 6,422,796 | B1 | * | 7/2002 | Tomaini .......................... | 411/544 |
| 6,665,991 | B2 | * | 12/2003 | Hasan .............................. | 52/410 |
| 6,718,718 | B2 | * | 4/2004 | Haddock ......................... | 52/545 |
| 6,722,095 | B2 | * | 4/2004 | Kobetsky ......................... | 52/410 |
| 6,952,902 | B2 | * | 10/2005 | Yaros ............................... | 52/409 |
| 6,981,679 | B1 | * | 1/2006 | Mullen ............................ | 248/344 |
| 6,991,352 | B2 | * | 1/2006 | Garber et al. ................... | 362/396 |
| 7,168,670 | B2 | * | 1/2007 | Liang .............................. | 248/343 |
| 2003/0033780 | A1 | * | 2/2003 | Hasan .............................. | 52/410 |
| 2003/0033783 | A1 | * | 2/2003 | Kobetsky ......................... | 52/512 |
| 2006/0059789 | A1 | * | 3/2006 | Sargent ............................ | 52/26 |
| 2006/0185289 | A1 | * | 8/2006 | Gong et al. ..................... | 52/410 |
| 2006/0260670 | A1 | * | 11/2006 | Terunuma et al. .............. | 136/244 |
| 2008/0011921 | A1 | | 1/2008 | Aramaki et al. | |

FOREIGN PATENT DOCUMENTS

| | | | |
|---|---|---|---|
| JP | 08-093159 | | 4/1996 |
| JP | 09-177272 | | 7/1997 |
| JP | 11-107460 | A | 4/1999 |
| JP | 2003-155804 | A | 5/2003 |
| JP | 2003-253827 | A | 9/2003 |
| JP | 2003253827 | A * | 9/2003 |
| JP | 2004-332200 | | 11/2004 |
| JP | 2005-264441 | | 9/2005 |
| JP | 2006-052529 | | 2/2006 |

* cited by examiner

*Primary Examiner* — Brian E Glessner
*Assistant Examiner* — Joshua Ihezie
(74) *Attorney, Agent, or Firm* — Nixon & Vanderhye P.C.

(57) ABSTRACT

A structure support apparatus for anchoring and supporting a structure upon a roof includes a bowed plate having a dome-shaped convex portion formed in the center of the bowed plate projecting from the concave side toward the convex side of the bowed plate. A screw hole is formed in the dome-shaped convex portion, penetrating the center of the bowed plate, and the structure is supported by the apex of the dome-shaped convex portion.

5 Claims, 12 Drawing Sheets

STRUCTURE SUPPORT APPARATUS AND STRUCTURE INSTALLATION METHOD

CROSS REFERENCE TO RELATED APPLICATION

This application claims priority under 35 U.S.C. §119(a) on Japanese Patent Application No. 2006-238089, filed Sep. 1, 2006, the content of which is hereby incorporated by reference in its entirety.

BACKGROUND

1. Field of the Technology

The technology presented herein relates to a structure support apparatus and structure installation method for supporting and anchoring a structure, such as a solar cell module used in a residential photovoltaic power generation system, to the roof or the like of a house.

2. Description of the Related Art

A residential photovoltaic power generation system has been provided for energy conservation or effective use of solar energy. With this commonly-known system, a solar cell module is installed on the roof or the like of a house, and power generated by the solar cell module is supplied to the residence. Making use of this kind of system requires construction for installing the solar cell module on the roof or the like to be carried out. At the time of installation, it is necessary for the solar cell module to be mounted in a "floating" state, in which clearance is provided between the solar cell module and the surface of the roof, so that wiring and so on of the solar cell module can be performed. In addition, because roofs are directly exposed to the elements, it is necessary for the solar cell module to be strongly attached to the roof so as not to be blown away by strong winds; furthermore, care must be taken so that the roof does not develop leaks in the areas where the solar cell module is mounted.

JP H8-93159A discloses background art relating to a mounting structure for installing a solar cell module on a slate roof. Here, support hardware for mounting the solar cell module is installed on the roof board, and water resistance processing is performed on the areas where the support hardware is mounted; the slate shingles are processed and installed so that the slate shingles and support hardware do not overlap. After this, vertical and horizontal crossbars for mounting the solar cell module are combined into a lattice shape and placed on the support hardware, and the solar cell module is attached on top of the crossbars.

Furthermore, JP 2006-52529A discloses background art relating to a water-resistant structure used for installing a solar-use device on a roof Here, anchoring hardware for installing the solar-use device is installed on the roof board, and the anchoring hardware is sheathed in a water-resistant cover, with only the bolts of the anchoring hardware penetrating and protruding from the water-resistant cover. A frame is mounted onto the bolts, upon which the solar-use device is fixed and supported. Rainwater flows around the periphery of the water-resistant cover, avoiding the anchoring hardware; thus rainwater does not leak in via the space between the anchoring hardware and the roof board.

However, according to the technology described in JP H8-93159A, the water-resistance processing involves filling the space around the support hardware with a sealant, and thus performing this processing requires time and effort. Furthermore, the water resistance depends solely on the sealant used, and thus has poor durability.

While the structure according to the technology described in JP2006-52529A is sheathed in the water-resistant cover and thus excels in terms of durability, the anchoring hardware and water-resistant cover are separate bodies, both of which are required to be mounted separately. When taken with screws, pins, and the like, the number of parts increases, which complicates the installation process. Furthermore, when the size of the anchoring hardware is increased to improve its strength, the water-resistant covers that sheathe the anchoring hardware become extremely large and stand out, resulting in a visually unappealing sight after construction.

SUMMARY

Having been conceived in light of the stated problems with the conventional art, it is a feature of an example embodiment presented herein to provide a structure support apparatus capable of improved strength, and having excellent durability, a small number of parts, and an easy installation procedure, without significantly increasing the size.

A further feature of the example embodiment is to provide a structure installation method for supporting and anchoring a structure on a roof using the aforementioned structure support apparatus of the present invention.

To solve the abovementioned problems, the structure support apparatus according to the example embodiment is a structure support apparatus for anchoring and supporting a structure upon a roof, and comprises a bowed plate having a dome-shaped convex portion formed in the center of the bowed plate projecting from the concave side toward the convex side of the bowed plate, in which screw hole is formed in the dome-shaped convex portion, penetrating the center of the bowed plate, and the structure is supported by the apex of the dome-shaped convex portion.

To solve the abovementioned problems, the structure support apparatus according to the present invention is a structure support apparatus for anchoring and supporting a structure upon a roof, and comprises a bowed plate having a dome-shaped convex portion formed in the center of the bowed plate projecting from the concave side toward the convex side of the bowed plate, in which screw hole is formed in the dome-shaped convex portion, penetrating the center of the bowed plate, and the structure is supported by the apex of the dome-shaped convex portion.

In addition, the bowed plate is a rectangle, and the bowed plate is bowed so that two opposing sides of the rectangle form arcs.

Furthermore, a reinforcement member is provided on the inner side of the dome-shaped convex portion, and the screw hole passes through the bowed plate and the reinforcement member.

Additionally, the apex of the dome-shaped convex portion has a support surface for supporting the structure, and the screw hole is provided vertically relative to the support surface.

Furthermore, a plurality of screw holes are provided in the dome-shaped convex portion, and a space is provided between the screw holes.

An installation method according to the example embodiment is a structure installation method for anchoring and supporting a structure on a roof using the abovementioned structure support apparatus according to the example embodiment, and comprises the steps of: inserting part of the bowed plate of the structure support apparatus between roof material portions vertically overlapping in a stepped pattern on the roof, with the concave surface of the bowed plate facing the surface of the roof; screwing a screw into the roof through the screw hole of the dome-shaped convex portion and tightening the screw down, thereby anchoring the bowed plate down to the roof; and supporting the structure on the apex of the dome-shaped convex portion.

According to the structure support apparatus of the example embodiment configured in this manner, a dome-shaped convex portion is formed protruding from the center of the bowed plate; screw holes are provided in the dome-shaped convex portion; and the apex of the dome-shaped convex portion supports the structure. Here, the bowed plate is arranged on a roof with the concave side of the bowed plate facing the surface of the roof. Screws are passed through the screw holes of the dome-shaped convex portion, screwed into the roof, and tightened down, thereby pressing the bowed plate down upon the roof and anchoring the bowed plate to the roof. The bowed plate is pushed strongly down upon the roof due to the force exerted by the screws, thus becoming flat in shape. At this time, the outer sides of the bowed plate tighten against the roof due to the elastic force of the bowed plate, making the area between the bowed plate and the roof water-resistant. The apex of the dome-shaped convex portion supports the structure; therefore, rainwater flows on the surface of the roof and the bowed plate and does not leak into the screw holes and the like of the dome-shaped convex portion, which is in a higher position than these surfaces.

The bowed plate and the dome-shaped convex portion are a single structure, which makes the installation thereof easy and increases the strength while at the same time suppressing an increase in size.

For example, the bowed plate is a rectangle, and the bowed plate is bowed so that two opposing sides of the rectangle form arcs. In this case, when the bowed plate is pressed down and anchored on the roof, the two sides that originally form arcs become linear; due to the elastic force of the bowed plate, the other two sides tighten against the roof, and thus the area between these other two sides and the roof is rendered water-resistant. Here, in order to implement the water-resistant capability, it is necessary to appropriately set the orientation of the rectangular bowed plate, taking into consideration the slope of the roof and the direction in which rainwater flows.

Furthermore, a reinforcement member is provided on the inner side of the dome-shaped convex portion, and the screw hole passes through the bowed plate and the reinforcement member. Through this reinforcement member, the strength of the dome-shaped convex portion can be improved, and deformation of the dome-shaped convex portion due to the force exerted by the screws can be prevented, while allowing the bowed plate to be pressed down strongly and anchored to the roof through the force exerted by the screws.

Additionally, the apex of the dome-shaped convex portion has a support surface for supporting the structure, and the screw hole is provided vertically relative to the support surface. Through this, the screws are screwed in vertically relative to the support surface.

Furthermore, a plurality of screw holes are provided in the dome-shaped convex portion, and a space is provided between the screw holes. When the bowed plate is placed and anchored on roof material portions vertically overlapping in a stepped pattern on the roof, the bowed plate spans across the step formed by the roof material portions. For this reason, a plurality of screw holes is provided in the dome-shaped convex portion, with the screw holes of the dome-shaped convex portion being respectively located on both sides of the stepped area; the bowed plate can be tightened down on both sides of the stepped area. Through this, the bowed plate does not rise off the roof material portions on one of the sides of the stepped area, and a large space does not develop between the bowed plate and the roof material portions.

According to the installation method of the example embodiment, part of the bowed plate is inserted between roof material portions vertically overlapping in a stepped pattern on the roof. In this case, the space between the bowed plate and the roof facing up the slope of the roof is sheathed in roof material portions, preventing water from leaking in from this space. The bowed plate is arranged on a roof with the concave side of the bowed plate facing the surface of the roof. Screws are passed through the screw holes of the dome-shaped convex portion, screwed into the roof, and tightened down, thereby pressing the bowed plate down upon the roof and anchoring the bowed plate to the roof. Therefore, the bowed plate is pushed strongly down upon the roof due to the force exerted by the screws, thus becoming flat in shape. At this time, the outer sides of the bowed plate tighten against the roof due to the elastic force of the bowed plate, making the area between the bowed plate and the roof water-resistant. Furthermore, the apex of the dome-shaped convex portion supports the structure; therefore, rainwater flows on the surface of the roof and the bowed plate and does not leak into the screw holes of the dome-shaped convex portion, which is in a higher position than these surfaces.

BEST MODE

An embodiment shall be described hereinafter with reference to the drawings.

Figure 1A:
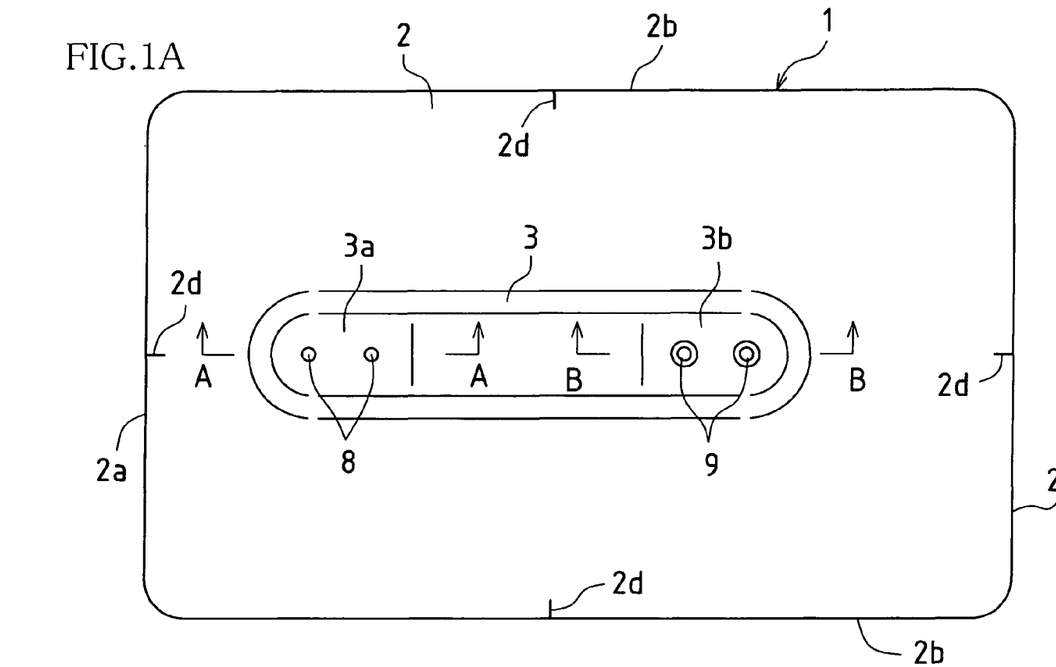
FIGS. 1A, 1B, and 1C are a plan view, a front view, and a side view of an embodiment of a structure support apparatus according to an example embodiment.
Figure 1B:
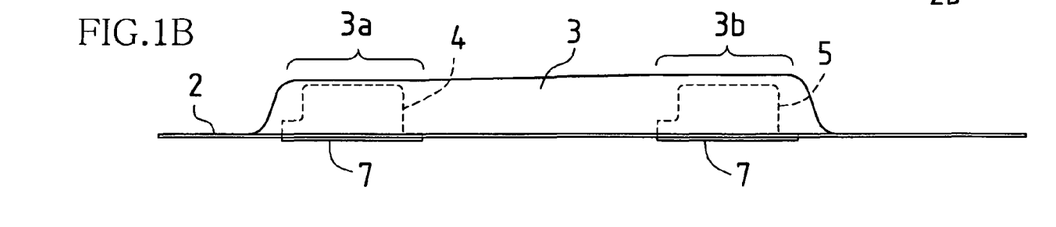
Figure 1C:
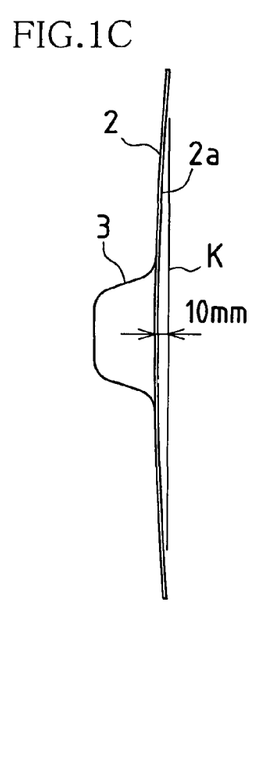
Figure 2A:
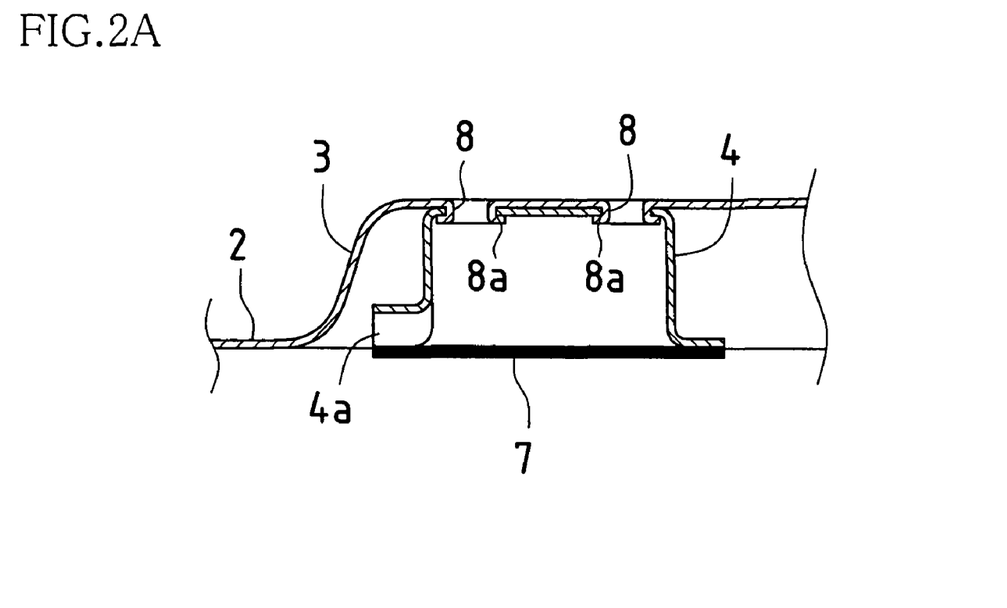
FIGS. 2A and 2B are cross-sections viewed along the A-A and B-B lines, respectively, indicated in FIG. 1A.
Figure 2B:
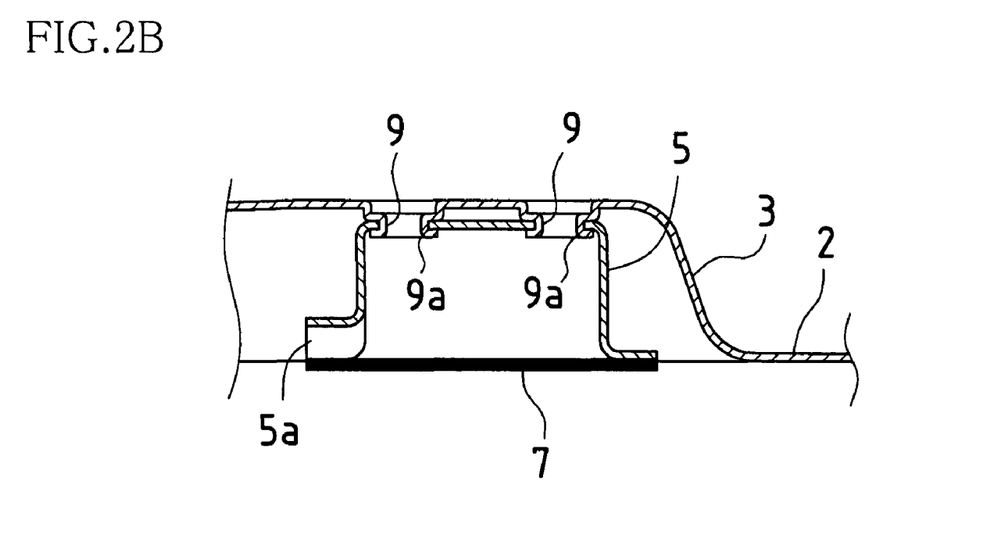

FIGS. 1A, 1B, and 1C are a plan view, a front view, and a side view of an embodiment of a structure support apparatus according to the present invention. Also, FIGS. 2A and 2B are cross-sections viewed along the A-A and B-B lines, respectively, indicated in FIG. 1A.

A structure support apparatus 1 of the present embodiment includes: a bowed plate 2, in which a rectangular metal plate has been caused to bow outward; a dome-shaped convex portion 3 protruding from the concave side to the convex side of the bowed plate 2 in a central area of the bowed plate 2; and two reinforcement members 4 and 5, disposed on the inner side of the dome-shaped convex portion 3. Furthermore, water-resistant butyl rubber sheets 7 are affixed to the bottom surfaces of the reinforcement members 4 and 5, and backing paper (not shown) is attached to the butyl rubber sheets 7.

Note that water-resistant butyl rubber sheets may be interposed between the dome-shaped convex portion 3 and the respective reinforcement members 4 and 5.

The bowed plate 2 and the dome-shaped convex portion 3 are a single structure formed from a rectangular metal plate by metallic molding. The bowed plate 2 is bowed so that two mutually opposing sides 2a of the rectangle form arcs; other opposing sides 2b of the rectangle form more moderate arcs or are linear in form. The two sides 2a of the bowed plate 2 that form an arc have a curvature in which a maximum of 10 mm of distance is present relative to a straight line K that connects the other two sides 2b.

Here, the bowed plate 2 is intentionally bowed. However, when forming the bowed plate 2 and the dome-shaped convex portion 3 as a single structure through metallic molding, it is more difficult to form the bowed plate 2 in a flat form. Thus, there is an advantage in that the formation of the structure support apparatus 1 is made stable due to the intentional bowing.

Two support surfaces 3a and 3b, for anchoring and supporting a slider base portion described later, are formed on the apex of the dome-shaped convex portion 3. The respective bottom surfaces of the slider base portion that make contact with these support surfaces 3a and 3b are not on the same horizontal plane, and instead are displaced relative to one another. Therefore, the support surfaces 3a and 3b of the dome-shaped convex portion 3 are also displaced relative to one another rather than being on the same horizontal plane, so as to be aligned with the bottom surfaces of the slider base portion.

The support surfaces 3a and 3b are reinforced and supported by the reinforcement members 4 and 5 respectively. Two screw holes 8 are formed in the reinforcement member 4 and the dome-shaped convex portion 3 on one side, and penetrate the reinforcement member 4 and the dome-shaped convex portion 3. In the same manner, two screw holes 9 are formed in the reinforcement member 5 and the dome-shaped convex portion 3 on the other side, and penetrate the reinforcement member 5 and the dome-shaped convex portion 3. Accordingly, four screw holes 8 and 9 are formed in the dome-shaped convex portion 3 and the reinforcement members 4 and 5.

The screw holes 8 on the side of the reinforcement member 4 are formed vertically relative to the support surface 3a of the dome-shaped convex portion 3. Similarly, the screw holes 9 on the side of the reinforcement member 5 are formed vertically relative to the support surface 3b of the dome-shaped convex portion 3.

The reinforcement members 4 and 5 are also formed from a metal plate through metallic molding; the bottom surfaces thereof are open, and water-resistant butyl rubber sheets 7 are affixed to these bottom surfaces. Drainage holes 4a and 5a are provided in the vicinity of these bottom surfaces.

The bottom surfaces of the reinforcement members 4 and 5 are withdrawn slightly upward from the lower end of the dome-shaped convex portion 3. Conversely, the bottom surfaces of the butyl rubber sheets 7 are positioned projecting slightly downward from the dome-shaped convex portion 3.

When the dome-shaped convex portion 3 is formed through metallic molding, the screw holes 8 and 9 are punched into the dome-shaped convex portion 3, as shown in FIGS. 2A and 2B. This causes burrs to be formed on the undersides of the screw holes 8 and 9. The burrs on the undersides of the screw holes 8 and 9 of the dome-shaped convex portion 3 are inserted into holes 8a and 9a of the reinforcement members 4 and 5, respectively. The burrs on the undersides of the screw holes 8 and 9 are then pressed out and caulked, thereby anchoring and supporting the reinforcement members 4 and 5 against the inner side of the dome-shaped convex portion 3.

The material of the bowed plate 2, the dome-shaped convex portion 3, and the reinforcement members 4 and 5 is galvanized sheet iron. In addition, the surfaces of the bowed plate 2 and the dome-shaped convex portion 3 are coated with a synthetic resin.

Figure 3A:
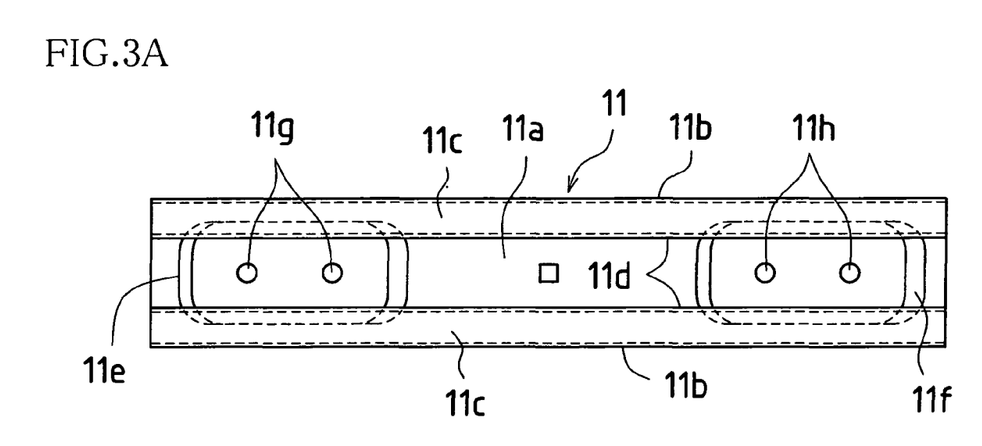
FIGS. 3A, 3B, and 3C are a plan view, a front view, and a side view of a slider base portion anchored to and supported by the apex of a dome-shaped convex portion of the structure support apparatus shown in FIGS. 1A through 1C.
Figure 3B:
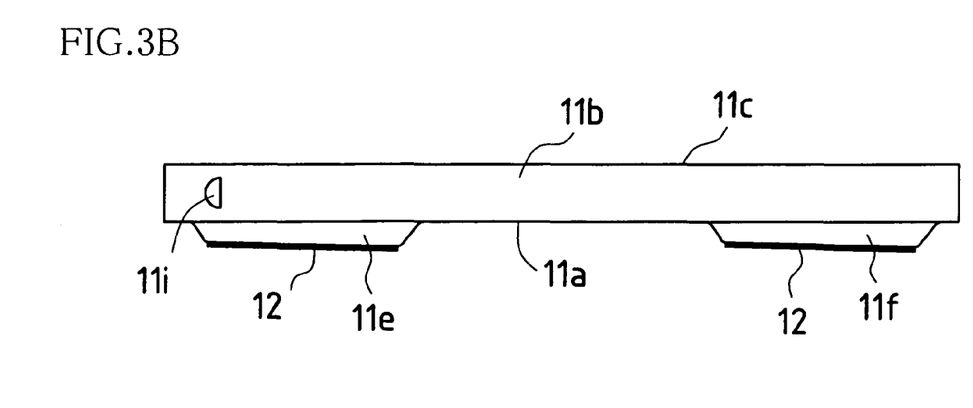
Figure 3C:
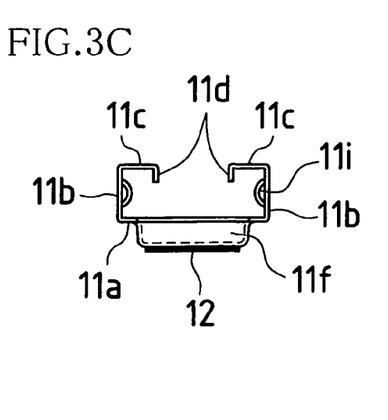

Next, descriptions shall be given regarding a slider base portion anchored to and supported by the apex of the dome-shaped convex portion 3 of the structure support apparatus 1, with reference to FIGS. 3A, 3B, and 3C. FIGS. 3A, 3B, and 3C are a plan view, a front view, and a side view of this slider base portion.

A slider base portion 11 is a single structure formed from a metal plate through metallic molding, and includes: a base wall 11a having a rectangular shape when viewed from above; two side walls 11b bent along both sides of the base wall 11a; two top walls 11c bent along the top sides of each of the side walls 11b; two flange portions 11d bent downward along the inner sides of the top walls 11c; and two convex portions 11e and 11f formed so as to protrude below the base wall 11a. Two each of screw holes 11g and 11h are formed in the convex portions 11e and 11f, respectively. Water-resistant butyl rubber sheets 12 are affixed to the bottom surfaces of the convex portions 11e and 11f, and backing paper (not shown) is attached to the butyl rubber sheets 12. Furthermore, slider stoppers 11i are formed in each of the side walls 11b.

The bottom surfaces of the convex portions 11e and 11f of the slider base portion 11 can be placed on the respective support surfaces 3a and 3b of the dome-shaped convex portion 3 of the structure support apparatus 1. In such a state, the screw holes 11g of the convex portion 11e of the slider base portion 11 overlap and align with the screw holes 8 of the support surface 3a of the dome-shaped convex portion 3. In the same manner, the screw holes 11h of the convex portion 11f of the slider base portion 11 overlap and align with the screw holes 9 of the support surface 3b of the dome-shaped convex portion 3.

Figure 4A:
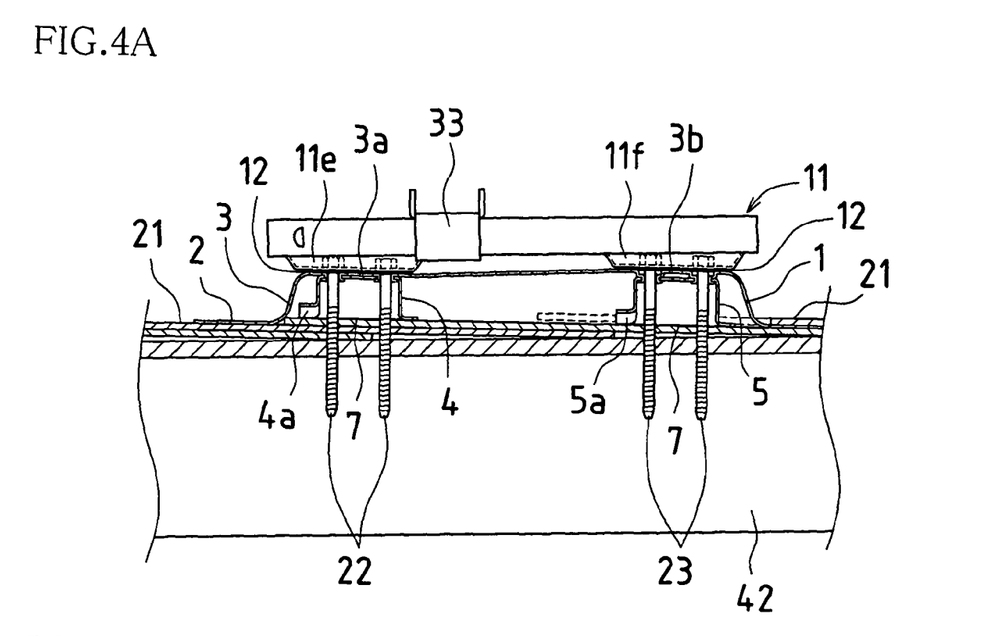
FIGS. 4A and 4B are a side view and a cross-section showing a state in which a slider has been inserted into a slider base portion.

The structure support apparatus 1 is arranged on roof material portions 21 as shown in FIG. 4A. Here, the bottom surfaces of the convex portions 11e and 11f of the slider base portion 11 are placed on the support surfaces 3a and 3b, respectively, of the dome-shaped convex portion 3 of the structure support apparatus 1, and two screws 22 are screwed through the screw holes 11g of the convex portion 11e of the slider base portion 11 and through the screw holes 8 of the dome-shaped convex portion 3. Furthermore, two screws 23 are screwed through the screw holes 11h of the convex portion 11f of the slider base portion 11 and through the screw holes 9 of the dome-shaped convex portion 3. Through this, the structure support apparatus 1 is anchored and supported upon the roof, and simultaneously, the slider base portion 11 is supported upon the dome-shaped convex portion 3 of the structure support apparatus 1.

Note that a construction procedure for mounting the structure support apparatus 1, the slider base portion 11, and the like to the roof shall be explained later.

Figure 5:
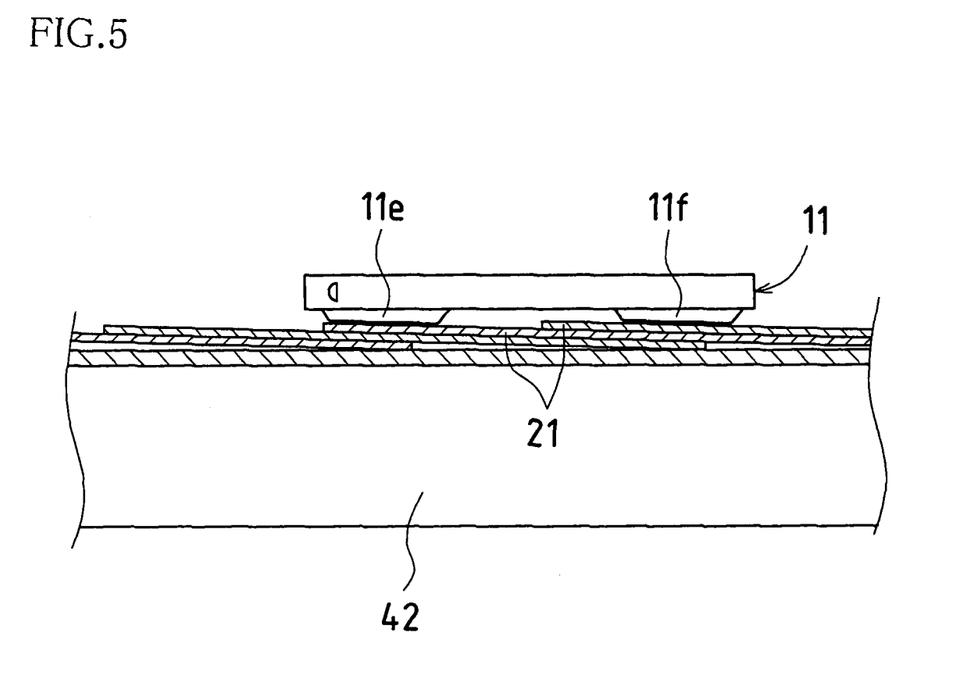
FIG. 5 is a side view showing a state in which the slider base portion shown in FIGS. 3A through 3C is arranged individually on a roof

As shown in FIG. 5, the slider base portion 11 can be anchored to the roof and used even in an individual state. In this case, the slider base portion 11 is arranged so as to span across two roof material portions 21, and the bottom surfaces of the convex portions 11e and 11f of the slider base portion 11 make contact with the surfaces of the respective roof material portions 21. Two screws are screwed through the screw holes 11g of the convex portion 11e of the slider base portion 11, and two screws are screwed through the screw holes 11h of the convex portion 11f of the slider base portion 11. Through this, the slider base portion 11 is anchored to the roof without the ends of the slider base portion 11 raising off of the roof surface on both sides of the step located between the roof material portions 21.

At this time, the bottom surfaces of the convex portions 11e and 11f of the slider base portion 11 are pre-set, taking the height and slope of the roof material portions 21 into consideration, so as to make contact with the surface of the roof material portions 21. For this reason, as mentioned earlier, the bottom surfaces of the convex portions 11e and 11f of the slider base portion 11 are not on the same horizontal plane, and instead are displaced relative to one another. Therefore, the support surfaces 3a and 3b of the dome-shaped convex portion 3 that match up with these bottom surfaces are also displaced relative to one another rather than being on the same horizontal plane.

This slider base portion 11 supports a slider so as to be movable in the longitudinal direction of the slider base portion 11.

Figure 4B:
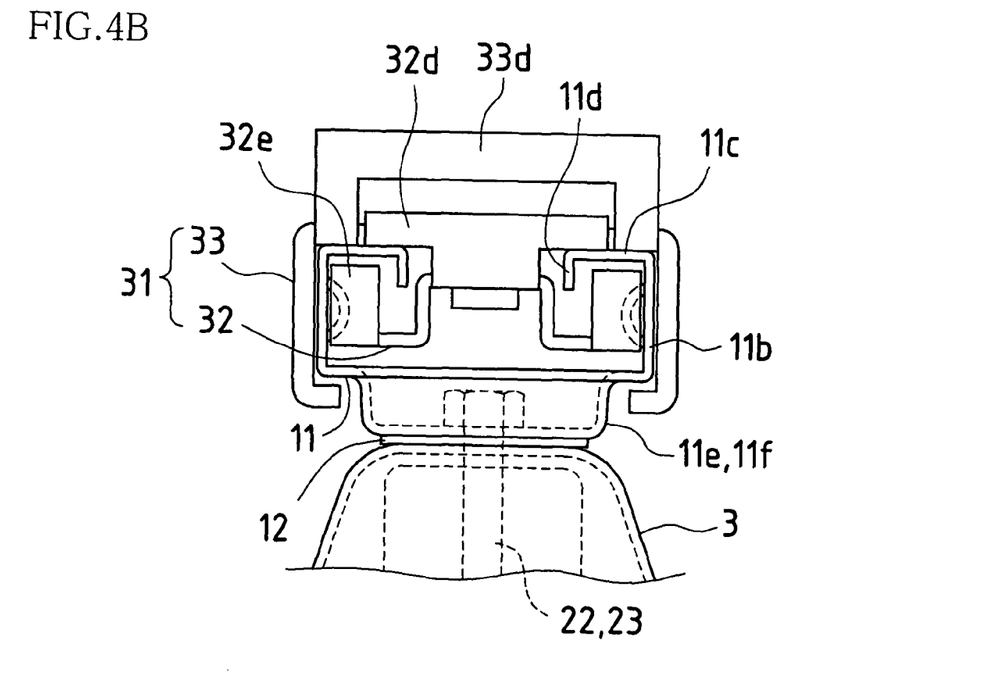
Figure 6:
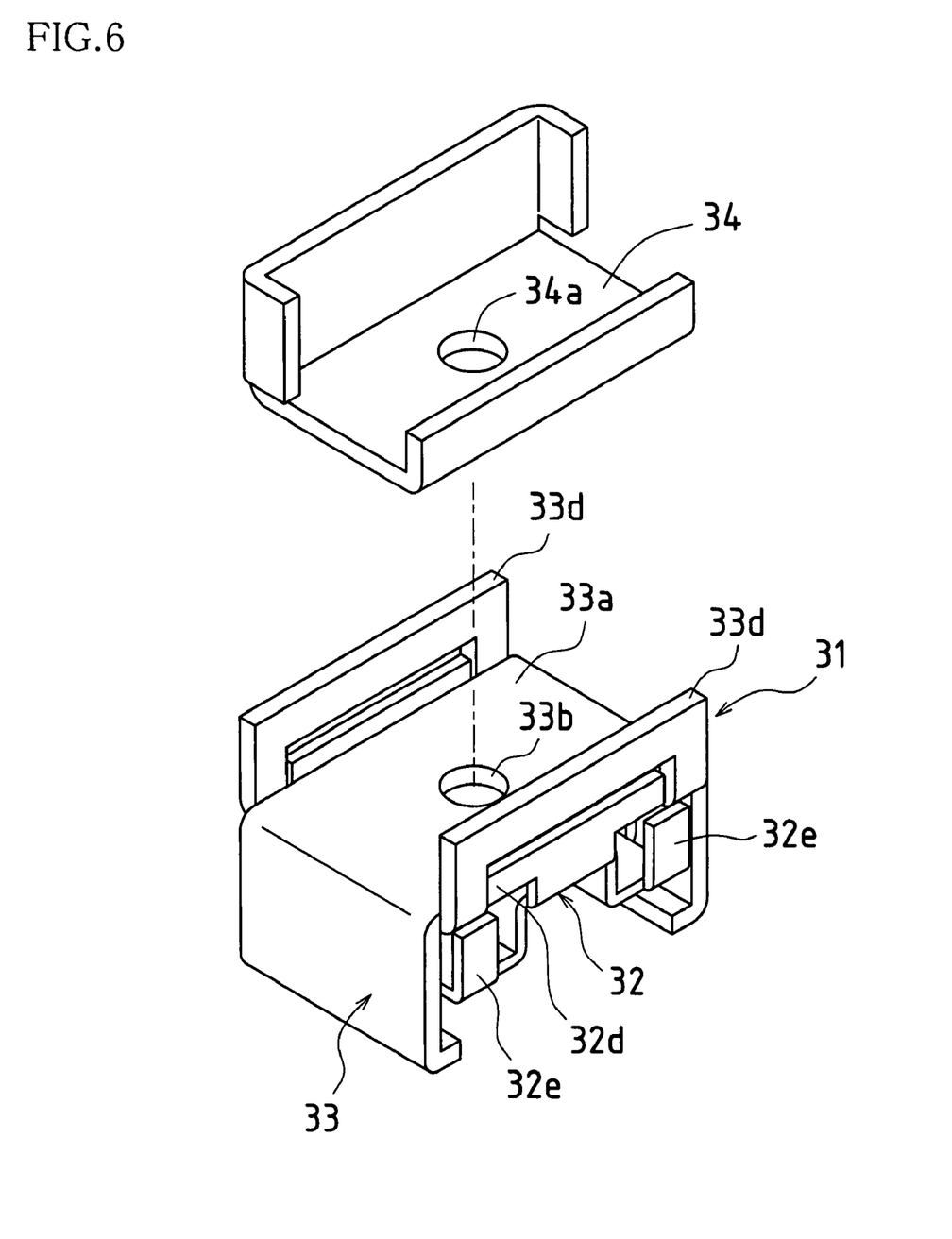
FIG. 6 is a perspective view showing a slider and a dock washer attached to the slider base portion shown in FIGS. 3A through 3C.

Next, a slider supported by the slider base portion 11 shall be described with reference to FIGS. 4A, 4B, and 6. FIGS. 4A and 4B are a side view and a cross section showing a state in which a slider has been mounted on the slider base portion 11, whereas FIG. 6 is a perspective view showing a slider.

A slider 31 is made up of a combination of an inner slider 32 and an outer slider 33; the inner slider 32 is inserted into the outer slider 33 from the side of the outer slider 33. In this combined state, the inner slider 32 is inserted into the inner side slider base portion 11 in a movable state, whereas the outer slider 33 is supported on the outer side of the slider base portion 11, also in a movable state.

Figure 7:
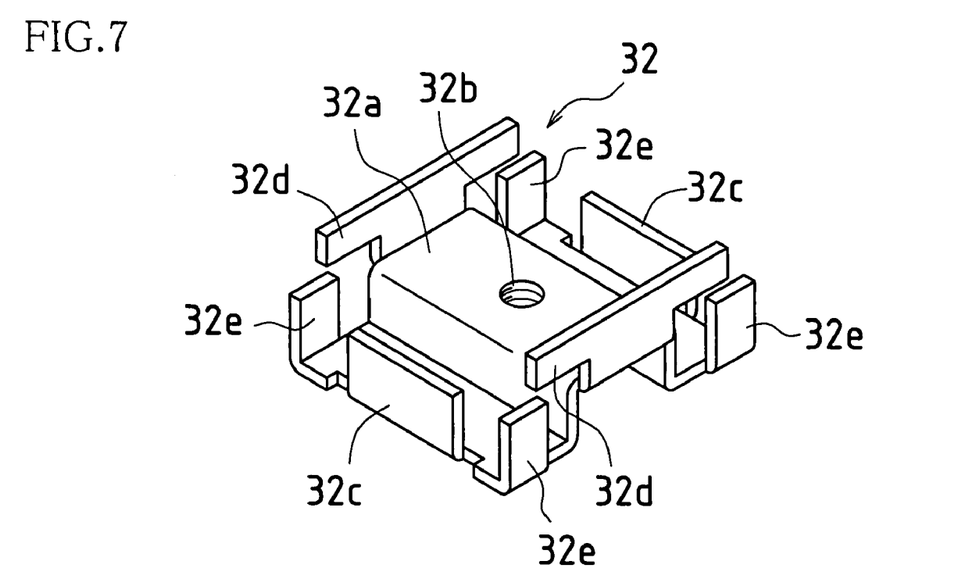
FIG. 7 is a perspective view showing an inner slider of the slider shown in FIG. 6.

As shown in FIG. 7, the inner slider 32 includes: a base portion 32a; a screw hole 32b in the center of the base portion 32a; side guide portions 32c on both sides of the base portion 32a; upper guide portions 32d on the front and back of the base portion 32a; and lower guide portions 32e on the four corners of the base portion 32a. Space is provided in the vertical directions between the upper guide portions 32d on the front and back and the lower guide portions 32e on the four corners.

Figure 8:
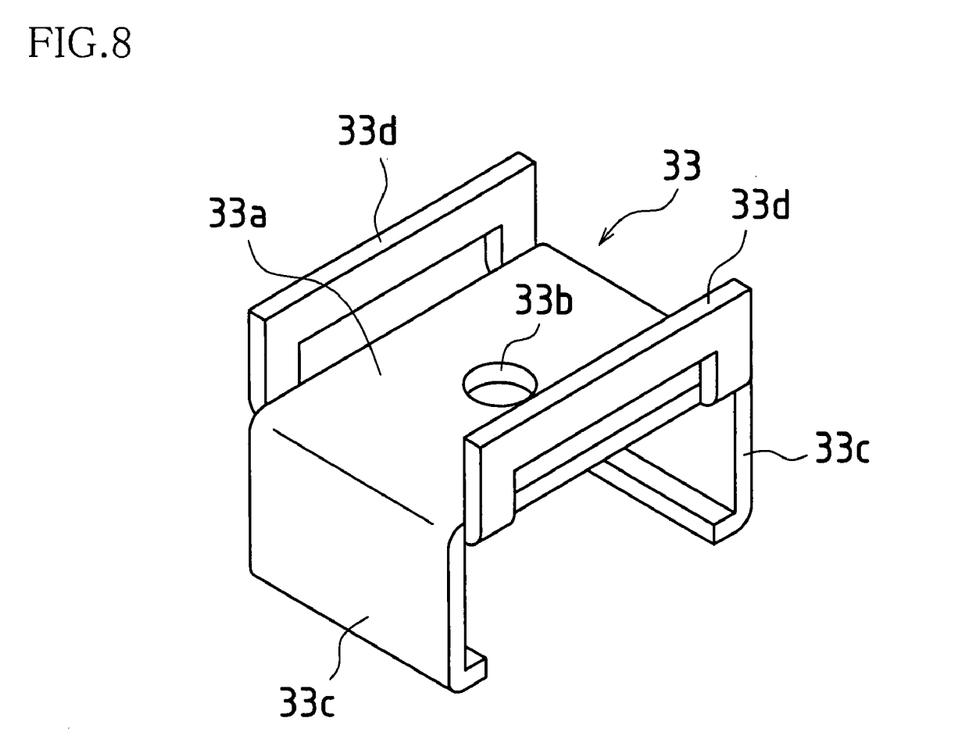
FIG. 8 is a perspective view showing an outer slider of the slider shown in FIG. 6.

As shown in FIG. 8, the outer slider 33 includes: a base portion 33a; a screw hole 33b in the center of the base portion 33a; L-shaped guide portions 33c on both sides of the base portion 33a; and positioning portions 33d protruding on the front and back of the base portion 33a.

In a state in which the inner slider 32 and outer slider 33 are combined and fitted on the slider base portion 11, as shown in FIGS. 4A and 4B, the side guide portions 32c on the sides of the inner slider 32 oppose the inner surfaces of the respective side walls 11b of the slider base portion 11; the top walls 11c of the slider base portion 11 fit between the upper guide portions 32d, on the front and back of the inner slider 32, and the lower guide portions 32e, on the four corners; and the flange portions 11d of the slider base portion 11 are positioned on the inner side of the lower guide portions 32e, on the four corners. Furthermore, the slider base portion 11 is enveloped by the base portion 33a and the inner sides of both L-shaped guide portions 33c of the outer slider 33. Accordingly, the inner slider 32 is supported in a movable state on the inner side of the slider base portion 11, and the outer slider 33 is supported in a movable state on the outer side of the slider base portion 11.

Figure 9:
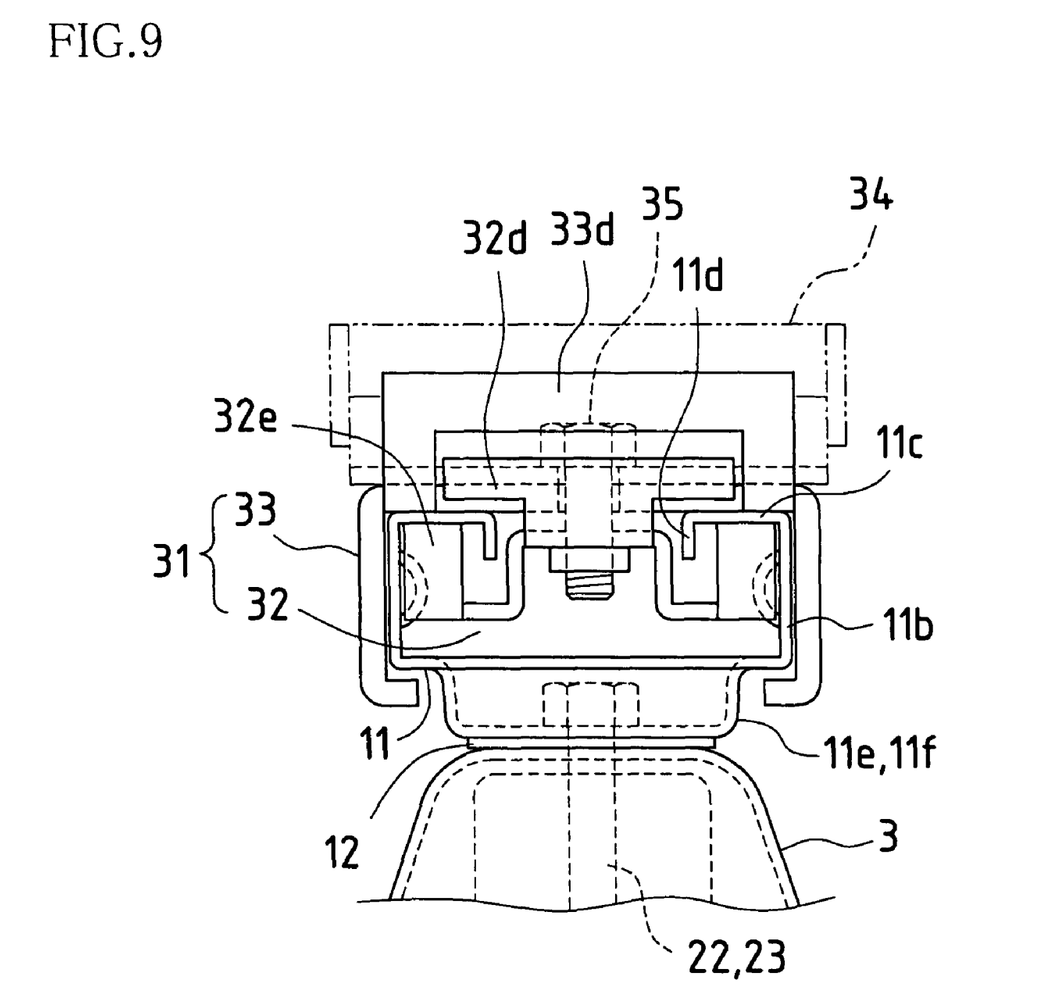
FIG. 9 is a cross-section showing a state in which a slider is fixed upon a slider base portion.

In this state, the sliders 32 and 33 are moved along the longitudinal direction of the slider base portion 11, disposing them in an appropriate position. Furthermore, a dock washer 34 is arranged on the top side of the outer slider 33, as shown in FIG. 6. Next, as shown in FIG. 9, a bolt 35 is passed through a screw hole 34a of the dock washer 34 and the screw hole 33b of the outer slider 33 and is screwed and tightened into the female screw of the screw hole 32b of the inner slider 32. Through this, the sliders 32 and 33 are fixed to one another, and at the same time, the slider base portion 11 is sandwiched between the sliders 32 and 33, thereby fixing the sliders 32 and 33 into position.

In actuality, the bolt 35 used to fix the sliders 32 and 33 into position is also used to anchor a structure, a support member thereof, or the like placed upon the sliders 32 and 33.

Using a combination of the inner slider 32 and the outer slider 33 in this manner improves the overall strength of the slider as compared to using only one of the sliders 32 and 33; furthermore, the slider base portion 11 is reinforced by the sliders 32 and 33, and the slider 31 and slider base portion 11 are not easily deformed.

In a hypothetical case in which only the inner slider 32 is used and a large upward force is exerted on the inner slider 32, that large force acts between the inner slider 32 and the slider base portion 11 and causes deformation in both, and there is the possibility that the inner slider 32 pulls out from between the top walls 11c of the slider base portion 11.

Next, a construction procedure for anchoring and supporting a solar cell panel, which is an example of a structure, upon a roof using the structure support apparatus 1, the slider base portion 11, the sliders 32 and 33, and the dock washer 34 shall be described.

Figure 10A:
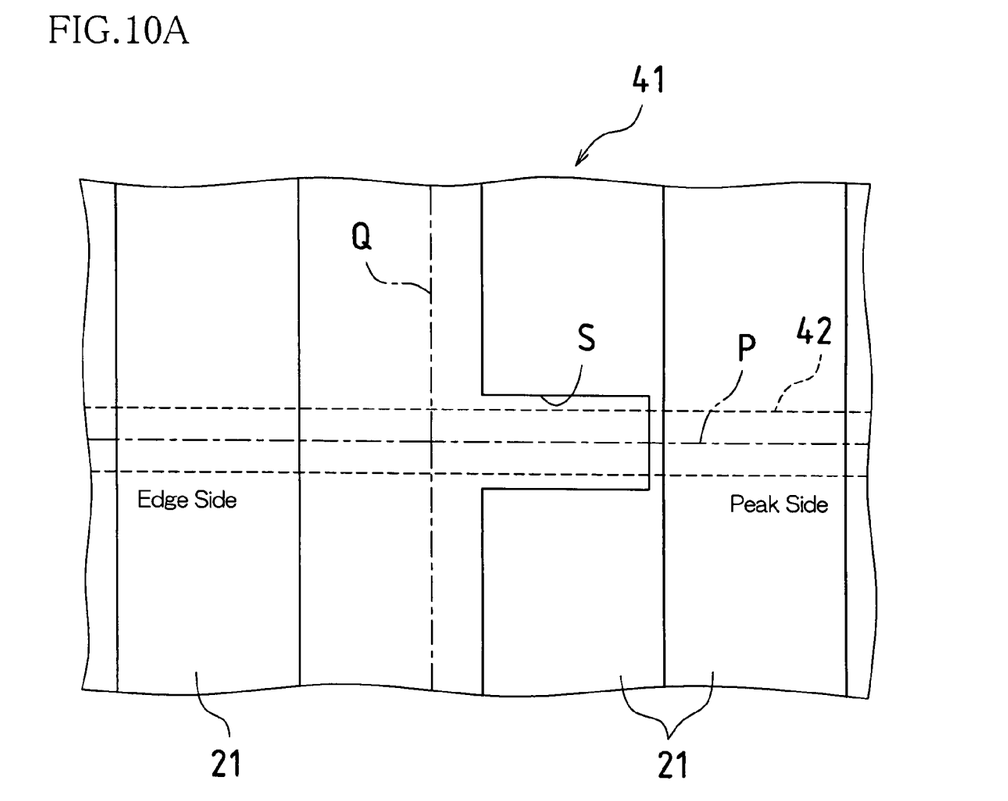
FIGS. 10A and 10B are a plan view and a side view showing an example of a roof on which the structure support apparatus shown in FIGS. 1A through 1C is installed.
Figure 10B:
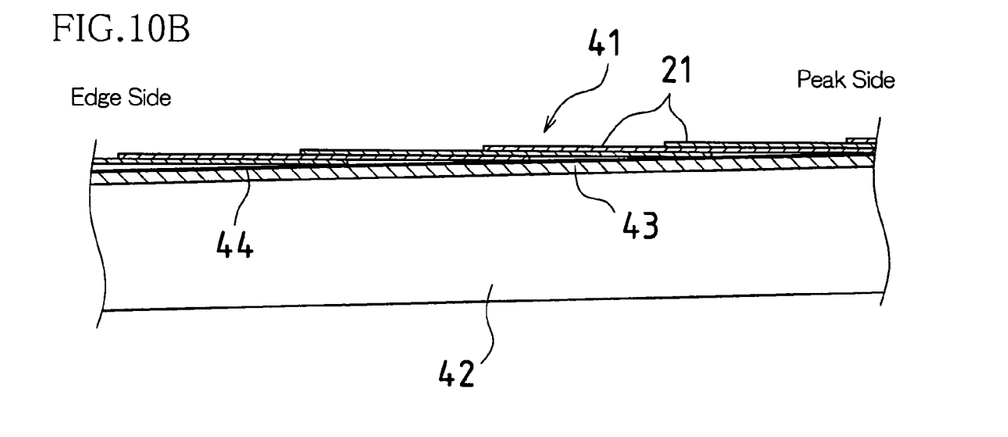

As shown in FIGS. 10A and 10B, in a roof 41, plural rafters 42 are disposed at set intervals in a direction perpendicular to the direction in which the roof 41 slopes, and each rafter 42 is arranged so that it runs along the direction in which the roof slopes. Roof boards 43 are disposed and fixed on top of the rafters 42, with no space between the roof boards, and a water-resistant sheet 44 is affixed on top of the roof board 43. Finally, plural roof material portions 21 are applied in a stepped state over the water-resistant sheet 44. The roof material portions 21 are band-shaped asphalt shingles, longer in the direction perpendicular to the direction in which the roof 41 slopes, and with a thickness of approximately 5 mm; plural band-shaped asphalt shingles are arranged in a stepped state in which the shingles partially overlap one another.

On the roof 41, first, a marking line P is marked on the roof material portions 21 along the center of the rafter 42. A marking line Q indicating the position of the border of the solar cell panel, which is the structure, is also marked on the roof material portions 21.

Then, using the marking lines P and Q as a reference, a rectangular cutout S of regulation size is formed in the roof material portions 21. The rectangular cutout S is positioned higher than the marking line Q on the roof 41, and the center of the rectangular cutout S overlies the marking line P.

Figures 11A, 11B:
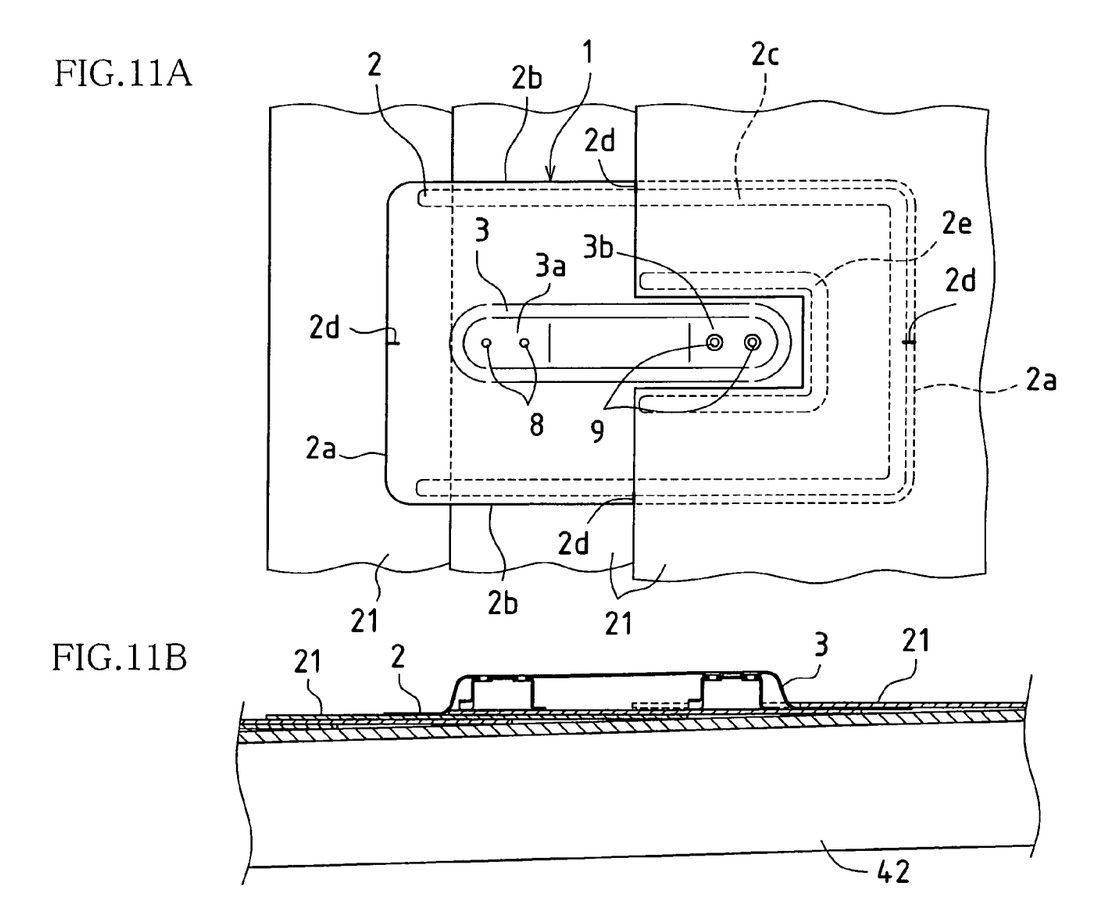
FIGS. 11A and 11B are a plan view and a side view showing a state in which the structure support apparatus shown in FIGS. 1A through 1C is installed on a roof.

Next, as shown in FIGS. 11A and 11B, silicone resin is applied to the back surface of the bowed plate 2 of the structure support apparatus 1 in the dotted line area 2c and the front surface of the bowed plate 2 in the dotted line area 2e. Then, after removing the backing paper from the butyl rubber sheets 7 of the reinforcement members 4 and 5 of the structure support apparatus 1, the bowed plate 2 is inserted approximately halfway into the space between the roof material portion 21 in which the rectangular cutout S is formed and the roof material portion 21 therebelow, with the concave side of the bowed plate 2 facing the roof material portions 21. At this time, the positioning of the bowed plate 2 is determined by matching markings 2d indicating the center of each side of the bowed plate 2 with the marking lines P and Q, respectively.

Next, the backing paper is removed from the butyl rubber sheets 12 of the convex portions 11e and 11f of the slider base portion 11 shown in FIG. 4A. Then, with the butyl rubber sheet 12 interposed therebetween, the bottom surfaces of the convex portions 11e and 11f of the slider base portion 11 are placed on the support surfaces 3a and 3b, respectively, of the dome-shaped convex portion 3 of the structure support apparatus 1, and the two screws 22 are screwed through the screw holes 11g of the convex portion 11e of the slider base portion 11, through the screw holes 8 of the support surface 3a of the dome-shaped convex portion 3, and into the rafter 42. Furthermore, the two screws 23 are screwed through the screw holes 11h of the convex portion 11f of the slider base portion 11, through the screw holes 9 of the support surface 3b of the dome-shaped convex portion 3, and into the rafter. As mentioned earlier, the screw holes 8 and 9 of the dome-shaped convex portion 3 are formed vertically relative to the support surfaces 3a and 3b, respectively, of the dome-shaped convex portion 3. Therefore, the screws 22 and 23 are screwed in vertically relative to the support surfaces 3a and 3b, and thus the anchoring force of the screws 22 and 23 is vertically exerted on the support surfaces 3a and 3b. Through this, the structure support apparatus 1 is anchored to and supported upon the roof 41 in a stable manner, and simultaneously, the slider base portion 11 is supported upon the dome-shaped convex portion 3 of the structure support apparatus 1.

Furthermore, the bowed plate 2 is pressed down upon the roof material portions 21, thus becoming flat in shape, and therefore the silicone resin in the dotted line area 2c on the back surface of the bowed plate 2 and in the dotted line area 2e of the front surface of the bowed plate 2 bond to the roof material portions 21 above and below. Through this, the space between the bowed plate 2 facing up the slope of the roof 41 and the roof material portion 21 is sealed, which ensures the prevention of water from leaking in from this space.

Furthermore, when the bowed plate 2 is pressed down upon the roof material portions 21, thus becoming flat in shape, the two sides 2a of the bowed plate 2 that originally form an arc become linear; due to the elastic force of the bowed plate 2, the other two sides 2b are pressed down strongly upon the roof material portions 21, and thus the area between these two sides 2b and the roof material portions 21 is rendered water-resistant.

As mentioned earlier, in the structure support apparatus 1, the bottom surfaces of the reinforcement members 4 and 5 are withdrawn slightly inward from the lower end of the dome-shaped convex portion 3. For this reason, when the bowed plate 2 is pressed down upon the roof material portions 21, thus becoming flat in shape, the bottom surfaces of the reinforcement members 4 and 5 raise slightly off of the roof material portions 21. Therefore, the bottom surfaces of the reinforcement members 4 and 5 do not make contact with the roof material portions 21 before the bowed plate 2, thus ensuring that the bowed plate 2 presses down upon the roof material portions 21.

Furthermore, as mentioned earlier, the bottom surfaces of the butyl rubber sheets 7 of the reinforcement members 4 and 5 are positioned projecting slightly outward from the dome-shaped convex portion 3. For this reason, the bottom surfaces of the butyl rubber sheets 7 of the reinforcement members 4 and 5 make contact with the roof material portions 21 before the bowed plate 2; the butyl rubber sheets 7 are sandwiched between the reinforcement members 4 and 5 and the roof material portions 21, which ensures that the space between the reinforcement members 4 and 5 and the roof material portions 21 is water-resistant.

In addition, when the screws 22 and 23 are tightened down strongly by an electric tool or the like, the reinforcement members 4 and 5 respectively press down upon the roof material portions 21 through the butyl rubber sheets 7, which limits the amount the screws 22 and 23 are screwed in and thus prevents the bowed plate 2 from undergoing excessive deformation.

Furthermore, butyl rubber sheets 12 are interposed between the support surfaces 3a and 3b of the dome-shaped convex portion 3 of the structure support apparatus 1 and the bottom surfaces of the convex portions 11e and 11f of the slider base portion 11, respectively, making the space between the two water-resistant. Regardless of the water resistance provided by the butyl rubber sheet 12, if rainwater enters into the reinforcement members 4 and 5 through the screw holes 8 and 9 of the support surfaces 3a and 3b of the dome-shaped convex portion 3, the rainwater passes through the drainage holes 4a and 5a of the reinforcement members 4 and 5 and down the slope of the roof 41, preventing the roof 41 from leaking.

Figure 12A:
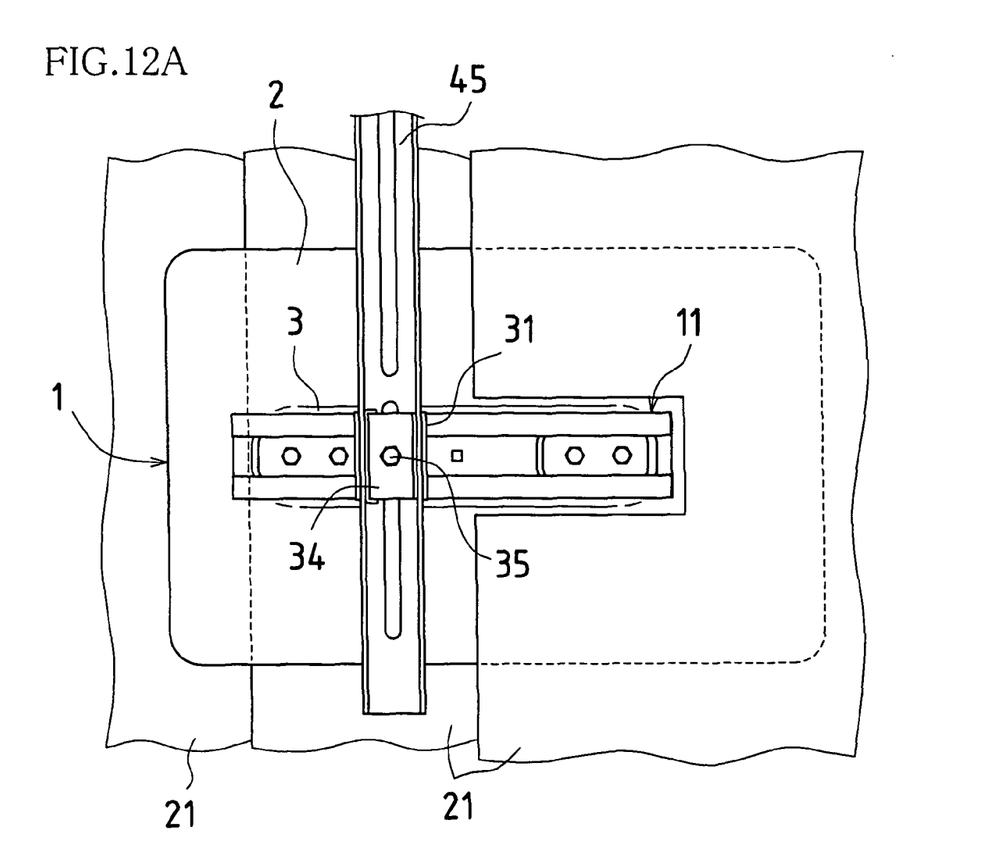
FIGS. 12A and 12B are a plan view and a side view showing a structure support apparatus, a slider base portion, a slider, and the like installed on a roof.
Figure 12B:
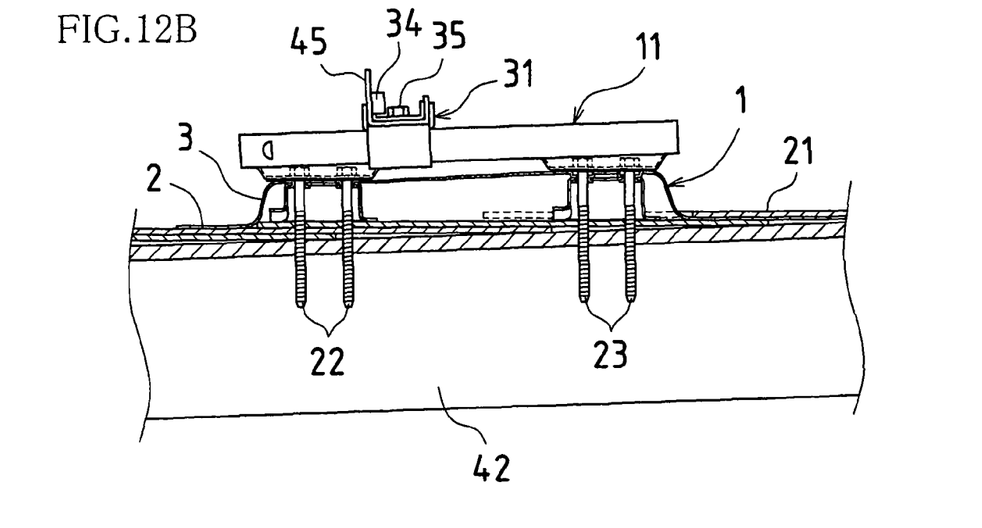

After the structure support apparatus 1 and the slider base portion 11 are installed in this manner, the slider 31 is mounted on the slider base portion 11 as shown in FIGS. 12A and 12B. The slider 31 is moved along the longitudinal direction of the slider base portion 11, disposing it in an appropriate position. An L-shaped crossbar 45 is disposed between the positioning portions 33d of the outer slider 33, and the dock washer 34 is placed upon the L-shaped crossbar 45. Then, the bolt 35 is passed through the screw hole 34a of the dock washer 34, a hole of the L-shaped crossbar 45, and the screw hole 33b of the outer slider 33, screwed into the female screw of the screw hole 32b of the inner slider 32, and tightened down. Through this, the sliders 32 and 33 are fixed to one another, and at the same time, the slider base portion 11 is sandwiched between the sliders 32 and 33, thereby fixing the sliders 32 and 33 into position. The L-shaped crossbar 45 is also sandwiched between the dock washer 34 and the outer slider 33, and is anchored thereby.

Figure 13:
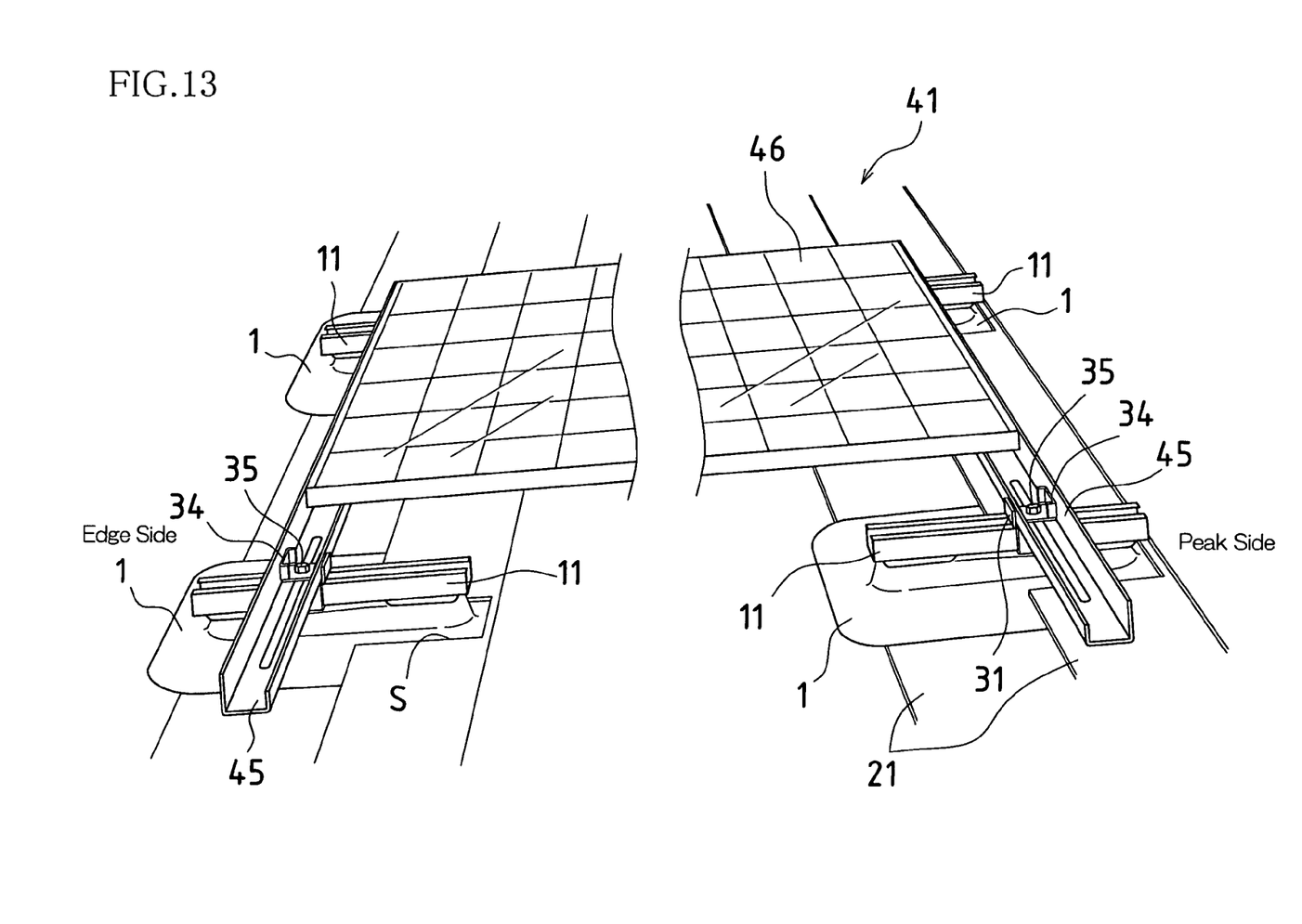
FIG. 13 is a perspective view showing a state in which a solar cell panel is anchored and supported on a roof.

This installation of the structure support apparatus 1 is performed in four places on the roof 41, supporting two L-shaped crossbars 45 on the roof 41. As shown in FIG. 13, a pair of structure support apparatuses 1 are aligned and installed on the peak side of the roof 41 perpendicular to the direction in which the roof 41 slopes, and these structure support apparatuses 1 support an L-shaped crossbar 45. Furthermore, a pair of structure support apparatuses 1 are aligned and installed on the edge side of the roof 41 perpendicular to the direction in which the roof 41 slopes, and these structure support apparatuses 1 support another L-shaped crossbar 45. Through this, the two L-shaped crossbars 45 are installed parallel to one another, with space provided therebetween.

Next, a solar cell panel 46 is disposed between the L-shaped crossbars 45; the upper and lower sides of the solar cell panel 46 are placed on and engaged with the respective L-shaped crossbars 45, thereby anchoring and supporting the solar cell panel 46.

In this manner, with the structure support apparatus 1 of the present embodiment, the bowed plate 2 is arranged on the roof 41 with the concave surface of the bowed plate 2 facing the surface of the roof 41. Screws are passed through the screw holes 8 and 9 of the dome-shaped convex portion 3 of the bowed plate 2, screwed into the rafters 42 of the roof 41, and tightened down, thereby pressing the bowed plate 2 down upon the roof material portions 21 and anchoring it to the roof 41. Therefore, the bowed plate 2 is pushed down strongly upon the roof material portions 21 due to the force exerted by the screws, thus becoming flat in shape. At this time, the two sides 2b of the bowed plate 2 are pushed down strongly on the roof material portions 21 due to the elastic force of the bowed plate 2, making the area between the two sides 2b and the roof material portions 21 water-resistant.

Furthermore, because the bowed plate 2 is arranged so that the sides 2b of the bowed plate 2 follow the direction of the slope of the roof 41, rainwater flows along the sides 2b of the bowed plate 2, which also makes it difficult for leaks to develop along the sides 2b.

In addition, because the bowed plate 2 is inserted approximately halfway into the space between vertically overlapping roof material portions 21, it is difficult for leaks to develop in the space between the bowed plate 2 facing up the slope of the roof and the roof material portions 21. Furthermore, silicone resin is applied to the back surface of the bowed plate 2 in the dotted line area 2c and the front surface of the bowed plate 2 in the dotted line area 2e, more effectively preventing leaks.

In addition, because the space between the bowed plate 2 facing up the slope of the roof and the roof material portions 21 is sufficiently narrow, it is difficult for rainwater to be blown thereinto, and thus there is no need to perform a separate water-resistance processing thereupon. Nevertheless, this space may be filled with silicone resin, thereby improving the water resistance.

In addition, the screw holes 8 and 9 are provided in the apex of the dome-shaped convex portion 3 of the structure support apparatus 1 in order to support the solar cell panel 46. Therefore, rainwater flows down on the surface of the roof material portions 21 and the bowed plate 2, and does not leak into the screw holes 8 and 9 in the apex of the dome-shaped convex portion 3, which is in a higher position than these surfaces.

In addition, because the bowed plate 2 and the dome-shaped convex portion 3 are a single structure forming the structure support apparatus 1, the process for mounting the structure support apparatus 1 is simple, and the overall strength of the structure support apparatus 1 is high. Furthermore, the metal plate that forms the structure support apparatus 1 may be made thicker in order to increase the strength, without significantly increasing the size.

It should be noted that the structure support apparatus is not limited to the preceding embodiment, and that many variations thereof are possible. For example, the shape of the bow of the bowed plate may be altered. If adding complexity to the process for forming the metal plate is permitted, a shape may be employed for the bowed plate in which all sides of the bowed plate press down on the surface of the roof. Furthermore, the shape of the dome-shaped convex portion, the number of screw holes, and the like may be altered as deemed fit. Alternatively, a plurality of dome-shaped convex portions may be formed in a single bowed plate.

In addition, the structure support apparatus of the example embodiment can be used to support other structures aside from solar cell panels. Solar heat collecting devices, ornamental apparatuses such as billboards, antennas, and the like can be given as examples of other structures.

The technology presented herein may be embodied in other forms without departing from the spirit or essential characteristics thereof. Accordingly, the embodiments disclosed in this application are to be considered in all respects as illustrative and not limiting. The scope of the invention is indicated by the appended claims rather than by the foregoing description. Furthermore, all changes which come within the meaning and range of equivalency of the claims are intended to be embraced therein.

What is claimed is:

1. A structure support apparatus for anchoring and supporting a structure on a roof, comprising:
    a dome-shaped convex portion projecting from a concave side toward a convex side of a bowed plate at the center being away from four sides of the bowed plate, and the structure is supported by an apex of the dome-shaped convex portion,
    wherein a screw hole is formed in the dome-shaped convex portion, penetrating the center of the bowed plate,
    wherein the bowed plate is pressed by a screw into the roof through the screw hole and deformed in a substantially flat shape so that all four sides of the bowed plate are in direct contact with the roof as outer sides tighten against the roof in the four sides, wherein
    at least one reinforcement rigid member is provided on an inner side of the dome-shaped convex portion, and wherein
    the at least one reinforcement rigid member prevents deformation of the dome-shaped convex portion due to a force exerted by the screw.

2. The structure support apparatus according to claim 1, wherein the bowed plate is a rectangle and is bowed so that two opposing sides of the rectangle form arcs.

3. A structure support apparatus for anchoring and supporting a structure on a roof, comprising:
    a dome-shaped convex portion projecting from a concave side toward a convex side of a bowed plate at the center being away from four sides of the bowed plate, and the structure is supported by an apex of the dome-shaped convex portion,
    wherein a screw hole is formed in the dome-shaped convex portion, penetrating the center of the bowed plate,
    wherein the bowed plate is pressed by a screw into the roof through the screw hole and deformed in a flat shape as outer sides tighten against the roof in the four sides,
    wherein at least one reinforcement rigid member is provided on the inner side of the dome-shaped convex portion, and the screw hole passes through the bowed plate and the reinforcement member.

4. The structure support apparatus according to claim 1, wherein the apex of the dome-shaped convex portion has a support surface for supporting the structure, and the screw hole is provided vertically relative to the support surface.

5. The structure support apparatus according to claim 1, wherein a plurality of screw holes are provided in the dome-shaped convex portion, and a space is provided between the screw holes.

* * * * *